Patented June 2, 1931

1,807,859

UNITED STATES PATENT OFFICE

FREDERICK G. MOSES, OF NEW YORK, RAYMOND W. HESS, OF BUFFALO, AND ROBERT L. PERKINS, OF EAST AURORA, NEW YORK, ASSIGNORS TO THE BARRETT COMPANY, OF NEW YORK, N. Y., A CORPORATION OF NEW JERSEY

CONCENTRATION OF ORES

No Drawing. Application filed May 20, 1927. Serial No. 193,053.

This invention relates to the separation of minerals and the concentration of ores by flotation processes, and is particularly directed to such separation and concentration carried out with the utilization of certain organic sulfur compounds as flotation or collecting agents.

According to the present invention, improved results can be obtained in the separation of minerals and the concentration of ores by carrying out the flotation operation with the addition to the mineral pulp or ore of a thiazyl polysulfide.

The thiazyl polysulfides employed as the flotation agents or adjuvants in the process of the present invention are generally characterized by containing the following nucleus

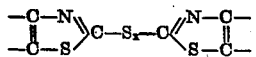

where $x$ denotes a number equal to 2 or more. The thiazole ring or nucleus may have hydrogen or may have the same or different independent substituents attached to the two adjacent carbons in the ring, or the two adjacent carbons may be part, or members, of an aromatic ring or nucleus as represented by the following general formula:

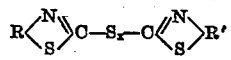

wherein R and R' represent the same or different aromatic carbocyclic nuclei which may contain the same or different substituents, and wherein said carbocyclic nuclei each have two adjacent carbon atoms as components or ring-members in separate thiazole nuclei, respectively. Of the thiazyl polysulfides, the arothiazyl disulfides are particularly important and especially benzothiazyl disulfide and its homologues.

Benzothiazyl disulfide is represented by the following formula:

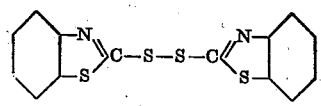

and is capable of dissolving or reacting with sulfur to form a polysulfide which may be represented by the following formula:

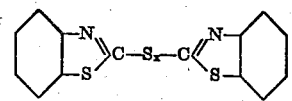

wherein $x$ denotes a number greater than 2.

The thiazyl polysulfides can be prepared in any suitable and well known manner. In general, for example, the disulfides may be prepared by the careful oxidation of the corresponding mercaptothiazoles, i. e., thiazyl mercaptans, or a mixture of thiazyl mercaptans, by means of air, sulfur or a halogen such as iodine, etc.; and the higher polysulfides can be prepared by dissolving or reacting the disulfides with sulfur. They may be used in the pure or purified state; and, in general, they may be employed in the crude or impure state.

In carrying out the flotation process of the present invention, the flotation agent comprising the thiazyl polysulfide may be incorporated with the ore or the mineral pulp in any suitable manner and at any suitable time which will insure a satisfactory flotation operation. For example, it may be incorporated in the free state or it may be dissolved, suspended or dispersed in any suitable solvent or dispersing agent such as, for example, water, or one or more of the usual flotation oils or oil mixtures, or in any suitable organic solvent or medium, and incorporating the resulting solution, suspension or dispersion with the ore or ore pulp. While the agents of the present invention show marked action as flotation, modifying or collecting agents in ore concentration, they exhibit in general insufficient frothing qualities and therefore are ordinarily used to advantage in conjunction with a suitable frothing agent, e. g., pine oil, turpentine, tar acids, etc. They may be sometimes also used to advantage in conjunction with other flotation agents, or in admixtures with each other or with mercaptans, particularly the corresponding thiazyl mercaptans.

The process of the present invention may be carried out in any suitable apparatus, for example, those of the pneumatic type such as the Callow cell, or those where the air is incorporated with the mixture by mechanical agitation such as the Janney apparatus, or the like.

It is of advantage in many cases, as with certain copper ores, to subject the ore pulp to the action of an amount of alkali sufficient to give it a neutral or an alkaline reaction before subjecting it to flotation with the aid of the flotation agents of the present invention. The alkali may be caustic alkali such as caustic soda or an alkaline salt such as soda ash, or it may be calcium oxide or hydrate, etc.

In the differential separation of various minerals, such as zinc blende from associated minerals, the presence of an alkali cyanide, or of copper sulfate, or of other similar substances, is sometimes advantageous.

The amount of flotation agent required to be used in the flotation operation will vary, it depending partly on the character and composition of the ore and partly on other factors. About one-sixth to one-quarter pound of the flotation agent, per ton of ore will in many cases be sufficient, while in other cases larger or smaller amounts than this may be required.

The invention will be further illustrated by the following specific example, but it will be understood that the invention is not limited thereto. The parts are by weight.

*Example.*—500 parts of a copper sulfide ore (a Miami Copper Company ore) assaying 1.24 per cent copper was ground in a ball mill with 210 parts water, 0.75 parts lime (equivalent to 3 pounds lime per ton of ore), and 0.0625 parts of benzothiazyl disulfide (equivalent to one-fourth pound per ton of ore) until practically all of the mixture was sufficiently fine to pass a 40 mesh screen. The ground pulp was diluted with water to give a mixture containing about 16 per cent solids and then subjected to flotation in a Janney flotation apparatus. The mixture was agitated 20 minutes during which time 0.06 parts of pine oil was introduced. 20.2 parts of a concentrate assaying 11.85 per cent copper was obtained which is a recovery in the concentrate of 38.5 per cent of the copper. The tailings assayed 0.80 per cent copper.

In a similar test using 500 parts of a copper ore (Anaconda Copper Company) assaying 1.52 per cent copper, and employing 0.0625 parts of methylbenzothiazyl disulfide in place of benzothiazyl disulfide, there was obtained 36 parts of concentrate assaying 18.1 per cent copper which is a recovery of 86.8 per cent. The tailings assayed 0.22 per cent copper.

It will be understood that the invention is not limited to the use of the particular agents or ingredients mentioned in the example and that other agents, particularly other flotation agents of the class specified, can be similarly used.

The present invention is of more or less general application to the treatment of different kinds of mineral substances, both natural and artificial, by flotation.

It will thus be noted that the present invention contemplates the utilization in the separation of minerals and the concentration of ores of thiazyl polysulfides; that the said flotation agents may be incorporated with the ore or mineral pulp at any suitable time and in any suitable manner; that they may be used in the free state or in admixture with one another or in solution, suspension or dispersion in any suitable solvent or medium; and that they may be used in conjunction with other flotation agents or with frothing agents, or with both.

We claim:

1. In effecting the concentration of minerals by flotation, the process which comprises incorporating with the mineral pulp a thiazyl polysulfide and a thiazyl mercaptan, and subjecting the same to a froth flotation operation.

2. A flotation agent comprising a thiazyl polysulfide and a mercaptan.

3. A flotation agent comprising an arothiazyl polysulfide and a mercaptan.

4. A flotation agent comprising benzothiazyl polysulfide and a mercaptan.

5. A flotation agent comprising a thiazyl polysulfide in admixture with a thiazyl mercaptan.

6. A flotation agent comprising a thiazyl disulfide in admixture with a thiazyl mercaptan.

7. A flotation agent comprising an arothiazyl disulfide in admixture with an arothiazyl mercaptan.

8. A flotation agent comprising benzothiazyl disulfide in admixture with benzothiazyl mercaptan.

9. In effecting the concentration of ores, the process which comprises subjecting the ore in the form of a suitable pulp to a froth flotation operation in the presence of a thiazyl polysulfide and a mercaptan.

10. In effecting the concentration of a copper sulfide ore, the process which comprises subjecting the copper sulfide ore in the form of a suitable pulp to a froth flotation operation in the presence of a thiazyl polysulfide and a mercaptan.

11. In effecting the concentration of a copper sulfide ore, the process which comprises subjecting the copper sulfide ore in the form of a suitable pulp to a froth flotation operation in the presence of a thiazyl disulfide and a thiazyl mercaptan.

12. In effecting the concentration of a copper sulfide ore, the process which comprises subjecting the copper sulfide ore in the form of a suitable pulp to a froth flotation operation in the presence of benzothiazyl disulfide and benzothiazyl mercaptan.

In testimony whereof we affix our signatures.

FREDERICK G. MOSES.
RAYMOND W. HESS.
ROBERT L. PERKINS.